Nov. 15, 1960  J. P. FERRIS  2,959,904
POWER LAWN RAKE HAVING MATERIAL DEFLECTOR
AND COLLECTING BASKET
Filed June 6, 1958  2 Sheets-Sheet 1

INVENTOR.
John P. Ferris
BY
ATTORNEY

Nov. 15, 1960 J. P. FERRIS 2,959,904
POWER LAWN RAKE HAVING MATERIAL DEFLECTOR
AND COLLECTING BASKET
Filed June 6, 1958 2 Sheets-Sheet 2
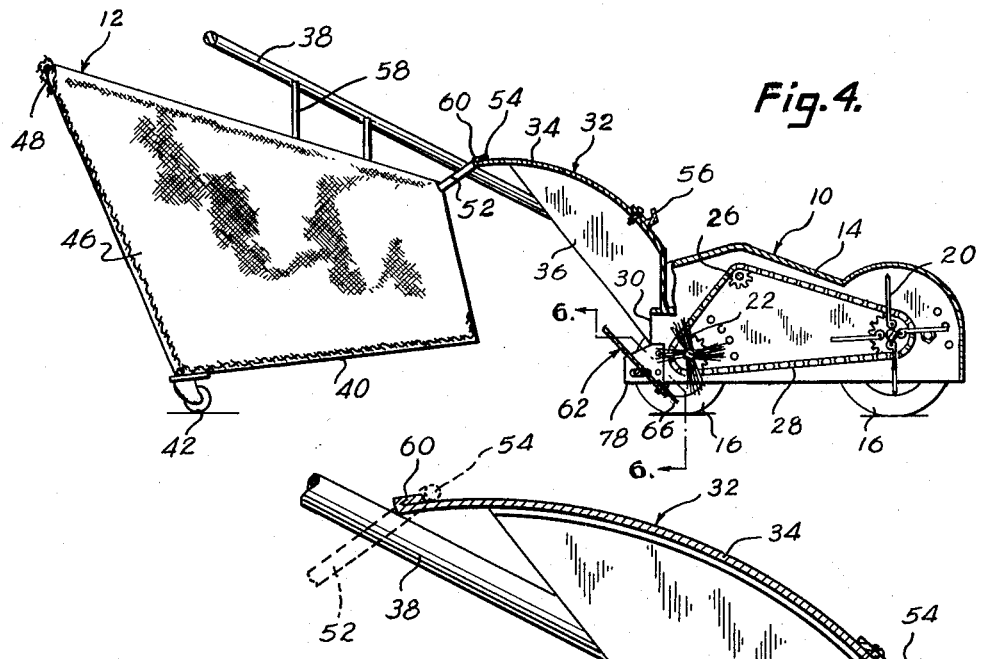
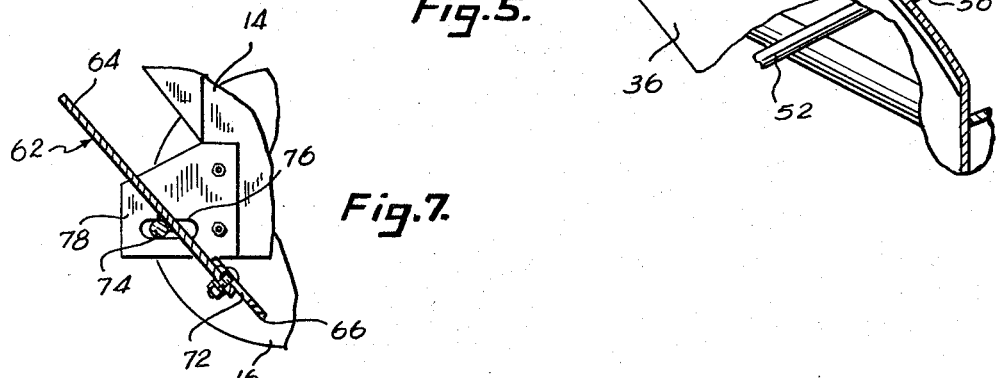
INVENTOR.
John P. Ferris
BY
ATTORNEY United States Patent Office 2,959,904
Patented Nov. 15, 1960

1

2,959,904

POWER LAWN RAKE HAVING MATERIAL DEFLECTOR AND COLLECTING BASKET

John P. Ferris, Lincoln, Nebr.
(501 Ohio St., Oshkosh, Wis.)

Filed June 6, 1958, Ser. No. 740,297

5 Claims. (Cl. 56—27)

This invention relates to a lawn cleaner and more particularly to a combined lawn rake and collecting basket, the primary object being to associate the basket with the rake in a manner to facilitate the conveyance of the collections in the basket to a point of disposal.

It is the most important object of the present invention to provide a collecting basket for lawn cleaners that constitutes essentially a component that is separate from the rake itself, but which is partially supported by the rake during normal use in an operative position relative thereto, all to the end that detachment of the basket from the rake necessitates merely the proper maneuvering of the basket in absence of releasing latches, locks or other means of interconnection.

Another important object of the present invention is to provide in the aforementioned combination an arrangement that permits tipping of the basket when the same is full to a position where the contents will not become scattered while the entire cleaner is transported to a point of discharge of the contents of the basket.

A further object is to provide an assembly that makes advantageous use of a hood forming a part of the rake for supporting the forwardmost end of a wheeled basket in either of two positions as above indicated.

Still another object of the present invention is to provide deflector means on the rake that cooperates with a power driven lawn sweep and with the basket, as well as with the said hood, to properly direct sweepings into the basket.

Another object of the present invention has to do with the way in which the deflector means is mounted for adjustment to compensate for wear in the brush means, to permit proper positioning with respect to the height of the stubble, and in accordance with the bulk of the sweepings being advanced thereover.

In the drawings:

Fig. 4 is a cross-sectional view taken on irregular line 4—4 of Fig. 2 but showing the basket in a position different from Figs. 1 and 2.

Fig. 5 is an enlarged, fragmentary, detailed, cross-sectional view similar to Fig. 4, but illustrating both positions of the bail support for the basket.

Fig. 6 is a fragmentary, detailed, cross-sectional view taken on line 6—6 of Fig. 4; and Fig. 7 is an enlarged, fragmentary, detailed, cross-sectional view taken on line 7—7 of Fig. 6.

Figure 1:
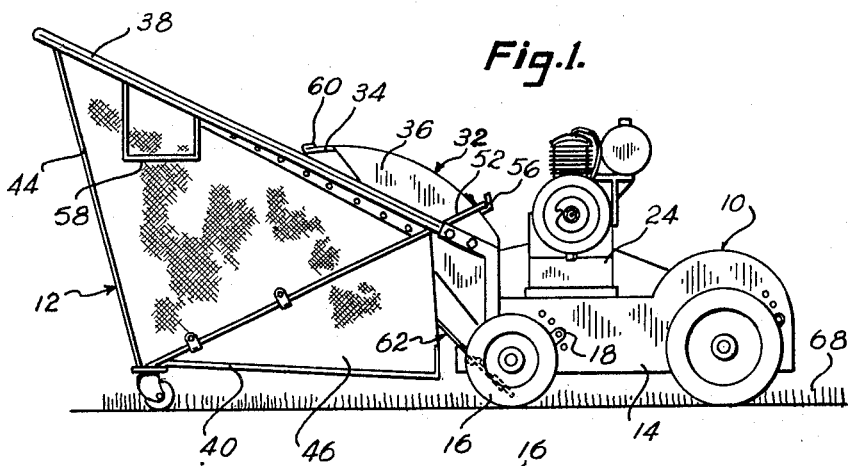
Fig. 1 is a side elevational view of a power lawn rake having a material deflector and collecting basket made pursuant to my present invention.

This is a continuation in part of my copending aplication Serial No. 703,145, filed December 16, 1957, and entitled "Power Driven Lawn Rake."

The lawn cleaner illustrated in the drawings consists of two basic components, to wit, a rake and a collecting basket broadly designated by the numerals 10 and 12 respectively. Rake 10 includes an open bottom housing 14 that is rendered movable through the medium of a plurality of wheels 16 attached to the housing 14 in a suitable manner to permit raising and lowering of the latter. To this end, there is illustrated a crank arm 18 for each wheel 16 respectively adjustably secured to the housing 14 in any desired manner.

A radially toothed comb 20 and lawn sweeping means 22 in the nature of a brush are rotatably carried by the housing 14 therewithin, and are driven by an internal combustion engine 24 mounted on the housing 14. The engine 24 is operably coupled with an idler 26, the latter of which is in turn operably connected with the two rotatable devices 20 and 22 by a continuous chain or the like 28.

Housing 14 is provided with a rearwardly opening outlet 30 and with a hood 32 disposed above the outlet 30 as best seen in Fig. 4. Hood 32 has an arcuate top 34 that extends upwardly and rearwardly from the housing 14 and a pair of substantially triangular sides 36 that depend from the top 34.

A preferably tubular U-shaped handle bar 38 is also attached to the housing 14 and extends upwardly and rearwardly therefrom as is evident from the drawings.

The collecting basket 12 has a relatively rigid bottom 40, such as a sheet metal panel, that is supported at the rearmost end thereof by a pair of relatively small caster wheels 42. Basket 12 is open at its top and front and is provided with suitable open framework 44 in the nature of relatively lightweight rods or tubes suitably attached to the bottom 40 and supporting the sides and back of the basket 12 which are preferably made from canvas or the like and constituting the body of the basket 10 which is designated by the numeral 46.

Figure 2:
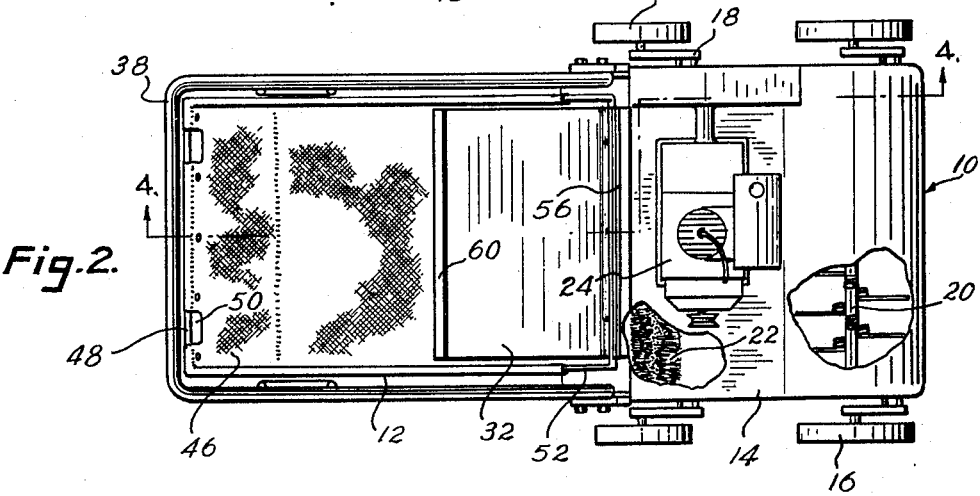
Fig. 2 is a top plan view thereof, parts being broken away for clearness.
Figure 3:
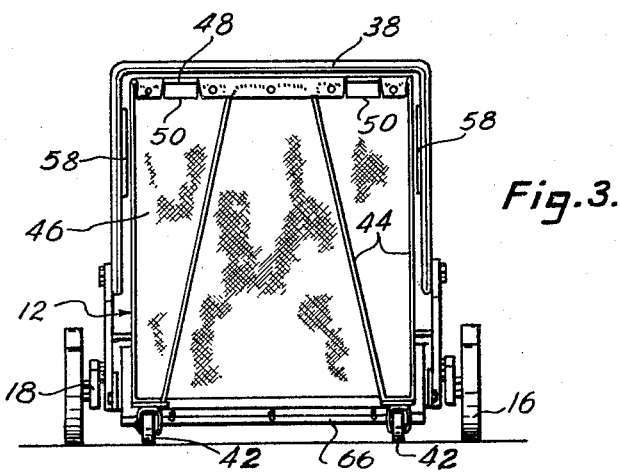
Fig. 3 is a rear elevational view thereof.

A continuous frame forming a part of the framework 44 at the uppermost periphery of the basket 12, has a horizontal, transverse portion 48 presenting a handle bar for the basket 12, canvas body 46 being cut away as shown in Figs. 2 and 3 to present hand holes 50. The forwardmost end of such uppermost peripheral frame of the basket 12 is in the nature of a U-shaped bail 52 that extends upwardly and forwardly from the uppermost and forwardmost corner of the basket 12. Bail 52 is adapted to embrace the hood 32 with the bight 54 of bail 52 resting upon the upper convex surface of top 34.

When the basket 12 is in the position illustrated in Fig. 1, its open front end is held in alignment with the outlet 30 by virtue of the fact that bight 54 of bail 52 bears against a stop 56 adjacent the forwardmost end of the hood 32.

The stop 56 which is secured rigidly to the top 34 may take the form of a hook as seen best in Fig. 5, to not only limit the extent of movement of the basket 12 toward the rake 10, as the result of bail 52 sliding forwardly and downwardly along the top 34, but to keep the basket 12 spaced rearwardly of housing 14 by preventing the bight 54 of bail 52 from moving outwardly and forwardly away from the convex surface of top 34.

It is to be noted that when the basket 12 is in such operative position shown in Fig. 1, it is partially beneath the hood 32 embraced by sides 36 of the latter.

Basket 12 is guided in proper trailing relationship to the rake 10 through the medium of a pair of retainers 58, depending from the handle bar 38 and embracing the basket 12.

When the basket 12 is in the position illustrated by Fig. 4 of the drawings, the bight 54 of the bail 52 rests upon the convex face of top 34 and against a stop 60 at the rearmost and uppermost edge of top 34. Thus, by virtue of the fact that stop 60 is appreciably higher than the stop 56, the bottom 40 is substantially horizontal when the basket 12 is in the position shown in Fig. 1, but is tipped rearwardly on its supporting wheels 42 when the front end of the basket 12 is supported by the hood 32 adjacent the stop 60.

Deflector means 62 is mounted on the housing 14 beneath the outlet 30 and the sweep means 22 in proper relationship to the forwardmost open end of the basket 12. It includes a rectangular panel 64 having a plate 66 coextensive in length therewith attached to its lowermost and forwardmost edge. The panel 64 and its plate 66 are disposed at an angle extending rearwardly and upwardly from adjacent lawn stubble 68 to the open front end of basket 12. The height of the plate 66 is variable by virtue of the fact that it is mounted on the panel 64 through a plurality of fasteners 70 within elongated slots 72 in the plate 66.

A rod 74 rigid to the lower face of panel 64 is slidable fore and aft within elongated slots 76 formed in opposed brackets 78 that are in turn attached to the housing 14. One end of the rod 74 is preferably transversely polygonal so that it will not rotate in its corresponding slot 76. The opposite end of the rod 74 is threaded to receive a locking nut 80 that clamps the panel 64 between the brackets 78, or more particularly, between a pair of washers 82 threaded on the rod 74 between brackets 78 and the proximal edges of panel 64.

As above mentioned, the two basic components 10 and 12 of the lawn cleaner are associated in the manner illustrated by Fig. 1 when the cleaner is to be placed in use. The cleaner may then be pushed over the lawn through use of the handle bar 38.

In any event, as the engine 24 drives the rotatable devices 20 and 22, the forwardmost fingered device 20 effectively combs the stubble 68, raising the cuttings, leaves and other debris off the ground and out of the stubble, depositing such material upon stubble 68 within the path of travel of the sweeping means 22. Thereupon, since both devices 20 and 22 are rotated clockwise, viewing Fig. 4, the bristles of the brush device 22 will sweep the material upwardly and rearwardly along the upper surface of deflector 62, into the basket 12. Manifestly, hood 32 cooperates in causing the sweepings to be properly deposited in the basket 12 by deflecting such sweeping downwardly and rearwardly as the same emanate from the outlet 30.

Plate 66 should be adjusted with respect to the ground so as to prevent the sweeping means 22 from directing any such sweepings rearwardly beneath the lower edge of plate 66. Similarly, the deflector means 62 should be adjusted fore and aft within the slots 76 in accordance with the bulk of the sweepings that pass rearwardly and upwardly between sweeping means 22 and the upper inclined face of deflector means 62. The extent of peripheral wear of the bristles forming the brush means 22 will likewise determine to some extent the position of the rod 74 within the slots 76.

After the basket 12 is filled, or at any time the operator desires to empty the same, he need merely grasp the frame portion 48 and tilt downwardly thereon while pulling the basket 12 rearwardly to a position where bail 52 engages the shoulder 60. It is seen that when the basket 12 is in such tilted position shown in Fig. 4, the sweepings will be less likely to fall from the basket 12 through the front open end thereof as the entire lawn cleaner is transported from the lawn to a point of unloading the gatherings from the basket 12.

When the bail 52 is in engagement with the stop 60 the basket 12 will be pulled by the rake 10, when the latter is pushed through use of handle bar 38. At the point of deposit of the gatherings, the operator can easily and quickly disengage the bail 52 from the stop 60 by again using the hand openings 50 and tilting downwardly on the frame portion 48, whereupon the basket 12 is separated from the rake 10 and may be moved to a point of unloading by using the wheel supports 42 for the basket 12.

Having thus described the invention what is claimed as new and desired to be secured by Letters Patent is:

1. In a lawn cleaner having an open bottom housing provided with a rearwardly opening outlet and lawn sweeping means carried by the housing therewithin, the combination of a rearwardly extending hood mounted on the housing above the outlet; a collecting basket open at the top and front thereof and provided with supporting wheels at the rearmost end thereof, and bail means on the basket looped over the hood whereby the latter supports the forwardmost end of the basket beneath the hood with the open front of the basket in alignment with said outlet; and stop means on the hood at the rearmost end thereof for retaining the bail means when the basket is shifted rearwardly to a position spaced from the housing.

2. In a lawn cleaner having an open bottom housing provided with a rearwardly opening outlet and lawn sweeping means carried by the housing therewithin, the combination of a rearwardly extending hood mounted on the housing above the outlet; a collecting basket, open at the top and front thereof, and provided with supporting wheels at the rearmost end thereof, and bail means on the basket looped over the hood whereby the latter supports the forwardmost end of the basket beneath the hood with the open front of the basket in alignment with said outlet; a first bail-engaging stop means on the hood adjacent the forwardmost end of the latter for limiting the extent of movement of the basket toward the housing; and a second stop means on the hood at the rearmost end thereof for retaining the bail means when the basket is shifted rearwardly to a position spaced from the housing.

3. In a lawn cleaner having an open bottom housing provided with a rearwardly opening outlet and lawn sweeping means carried by the housing therewithin, the combination of a rearwardly extending hood mounted on the housing above the outlet, there being a first and a second stop means on the hood; a collecting basket, open at the top and front thereof and provided with supporting wheels at the rearmost end thereof, and bail means on the basket looped over the hood whereby the latter supports the forwardmost end of the basket beneath the hood with the open front of the basket in alignment with said outlet; and deflector means carried by the housing beneath said outlet, and extending at an angle upwardly and rearwardly from beneath said sweeping means to the open front of said basket, said basket having a bottom disposed substantially horizontally when the bail means engages the first stop means, said hood inclining upwardly as said rearmost end thereof is approached whereby the hood holds the basket tipped rearwardly on its supporting wheels when the bail means engages the second stop means.

4. The invention of claim 3 and including shiftable means mounted on the housing and operably engaging said deflector means for shifting the latter toward or away from said outlet.

5. The invention of claim 3 and including an elongated plate shiftably mounted on the deflector means along the forward and lower end of the latter and extending therebelow to present a variable extension for said deflector means.

References Cited in the file of this patent

UNITED STATES PATENTS

| | | |
|---|---|---|
| 621,445 | Campbell et al. | Mar. 21, 1899 |
| 1,894,053 | Nobbs | Jan. 10, 1933 |
| 2,250,846 | Sullivan | July 29, 1941 |
| 2,268,250 | Gormley et al. | Dec. 30, 1941 |
| 2,505,576 | Reitan | Apr. 25, 1950 |
| 2,525,090 | Bott | Oct. 10, 1950 |
| 2,598,382 | Holden | May 27, 1952 |
| 2,642,710 | Tucker | June 23, 1953 |
| 2,670,486 | Daniell | Mar. 2, 1954 |
| 2,851,844 | Bailey | Sept. 16, 1958 |